May 8, 1923.  
C. H. BOYLE  
SEEDING DEVICE FOR GRAPEFRUIT  
Filed Feb. 21, 1923  
1,454,311
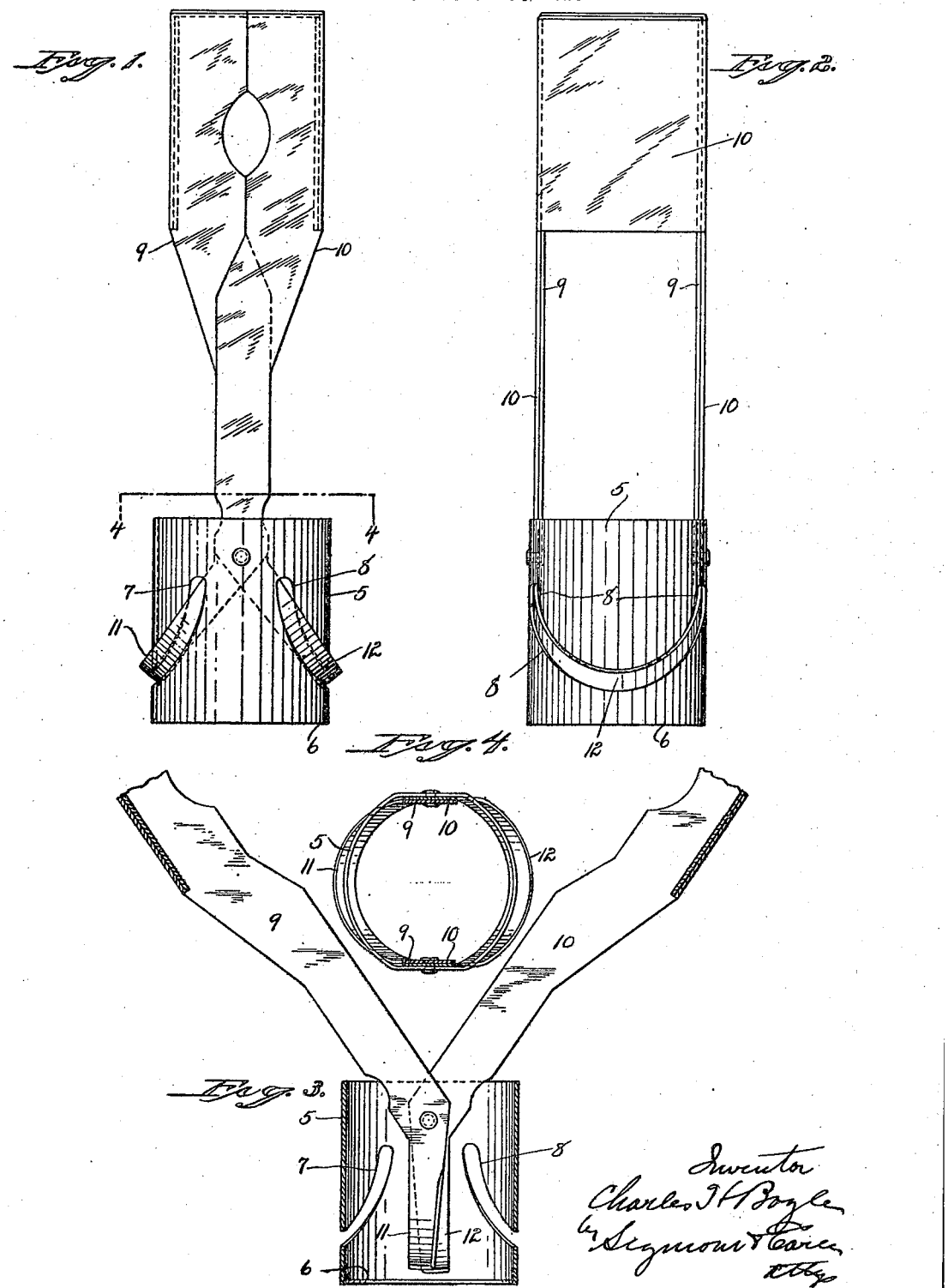

Patented May 8, 1923.

1,454,311

UNITED STATES PATENT OFFICE.

CHARLES H. BOYLE, OF NEW HAVEN, CONNECTICUT.

SEEDING DEVICE FOR GRAPEFRUIT.

Application filed February 21, 1923. Serial No. 620,373.

*To all whom it may concern:*

Be it known that I, CHARLES H. BOYLE, a citizen of the United States, residing at New Haven, in the county of New Haven and State of Connecticut, have invented a new and useful Improvement in Seeding Devices for Grapefruit; and I do hereby declare the following, when taken in connection with the accompanying drawings and the characters of reference marked thereon, to be a full, clear, and exact description of the same, and which said drawings constitute part of this application, and represent, in—

Fig. 1 a side view of a seeding device for grapefruit constructed in accordance with my invention.

Fig. 2 a vertical, sectional view of the same.

Fig. 3 a sectional view, showing the cutters in closed position.

Fig. 4 a sectional view on the line 4—4 of Fig. 1.

This invention relates to improvement in seeding devices for grapefruit, that is, a device for removing the seeds and core from the centers of grapefruit, the object of the invention being a simple arrangement of cutters whereby the core and seeds may be readily removed from the centers of halves of grapefruit preparatory to serving, and the invention consists in the construction as hereinafter described and particularly recited in the claims.

In carrying out my invention, I employ a tubular cutter 5 having a knife edge 6 at the bottom and formed on opposite sides with segmental slots 7 and 8. Pivoted to opposite sides, near the top of the tubular cutter, are two lever handles 9 and 10 provided at their lower ends with segmental cutters 11 and 12 adapted, when the upper ends of the handles are separated, to be brought together at the center of the tubular cutter and also adapted, when the lever handles are brought together, to extend outward through the slots 7 and 8. Grapefruit, to be served, is first cut transversely and then the tubular cutter, with the handles in closed position, is forced downward into the center of the half of a grapefruit, around the core and around the seeds, which are located immediately around the core. The handles 9 and 10 are then separated, as shown in Figure 3 of the drawings, which moves the cutters 11 and 12 toward each other, so as to sever the core below the seeds; then, when the device is withdrawn, the core and seeds will be removed therewith.

With this device, the core and seeds of a grapefruit may be readily and completely removed at a single cutting operation, thus permitting a large number of fruit to be prepared for the table within a very short time.

I claim:

1. A seeding device for grapefruit, comprising a tubular cutter, lever-handles connected therewith, the said handles provided at their lower ends with segmental cutters adapted to be moved toward each other by the separation of the upper ends of the handles.

2. A seeding device for grapefruit, comprising a tubular cutter formed at its lower end with a cutting edge and on opposite sides with segmental slots, lever-handles pivotally connected with the tubular cutter and formed at their lower ends with segmental cutters adapted, when in the open position, to extend through the slots in the tubular cutter, and adapted to be moved toward each other by the separation of the upper ends of the handles.

In testimony whereof, I have signed this specification in the presence of two subscribing witnesses.

CHARLES H. BOYLE.

Witnesses:
  FREDERIC C. EARLE,
  MALCOLM P. NICHOLS.